Nov. 26, 1968  H. HEINZER  3,412,525
APPARATUS FOR WRAPPING OBJECTS
Filed June 14, 1965  4 Sheets-Sheet 4
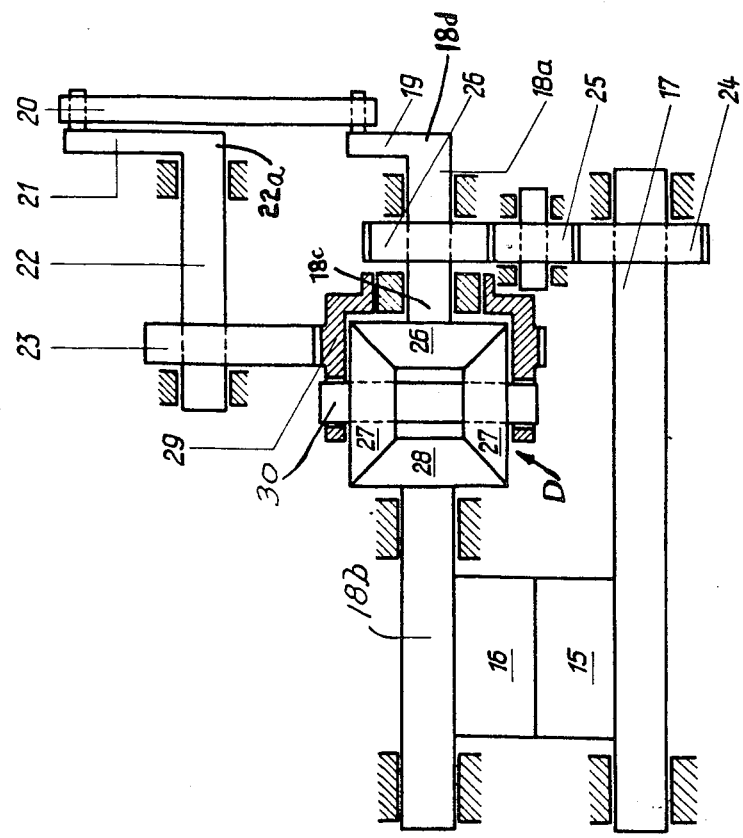
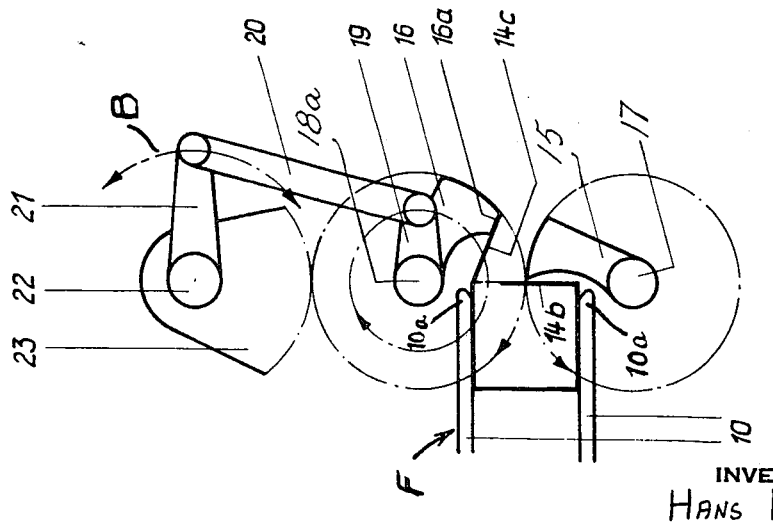
INVENTOR
HANS HEINZER
BY Werner W. Kleeman
His Attorney United States Patent Office 3,412,525
Patented Nov. 26, 1968

3,412,525
APPARATUS FOR WRAPPING OBJECTS
Hans Heinzer, Neuhausen am Rheinfall, Switzerland, assignor to Schweizerische Industrie-Gesellschaft, Neuhausen am Rheinfall, Switzerland, a corporation of Switzerland
Filed June 14, 1965, Ser. No. 463,644
Claims priority, application Switzerland, June 16, 1964, 7,817/64
7 Claims. (Cl. 53—229)

ABSTRACT OF THE DISCLOSURE

An apparatus for wrapping objects or articles wherein said objects or articles coming from a conveyor mechanism are pushed between a pair of spaced and movable plate members included within a folding compartment by a pusher means mounted for movement such that the operable end thereof describes a closed path. Rotating closing and welding jaws are provided adjacent the pair of spaced and movable plate members for folding-in and welding the ends of wrapping material utilized about each object. Additional means are provided for interconnecting the closing and welding jaws with the pair of spaced and movable plate members for displacing the latter in an oscillatory axial direction during operation of the closing and welding jaws.

---

The present invention relates to an improved apparatus for wrapping or enclosing objects delivered via conveyor means towards a folding compartment or chamber with sheets or blanks of wrapping material.

In prior art apparatus of this type the folding compartment is a stationary construction and the closing and welding jaws carry out a to-and-fro movement. During welding or heat-sealing of the wrapping material the articles or objects undergoing packaging must remain stationary. Thus, the efficiency of such type apparatus is limited.

Accordingly, it is a primary object of the present invention to provide an improved apparatus for wrapping objects which possesses increased efficiency, and with a relatively simple construction renders it possible to cleanly and tightly enclose objects or the like with wrapping material.

A further more specific object of this invention is directed to an improved construction of apparatus for enclosing objects in wrapping material during such time as the objects are in transit, to thereby increase the efficiency of the apparatus.

Another considerable object of this invention concerns itself with a new and improved apparatus for wrapping objects or articles which is relatively simple and economical in construction and highly efficient in operation.

In order to implement these and still further objects of the invention the apparatus for wrapping objects or articles designed according to the teachings of the present invention is manifested by the features of pusher means for taking over objects coming from conveyor means and for pushing them into a folding compartment, said pusher means being mounted for movement such that its operable end describes a closed path. Additionally, the folding compartment is constructed for movement in axial direction, and rotating closing and welding jaws are provided for folding-in and welding or heat-sealing the ends of the packaging or wrapping material.

Figure 1:
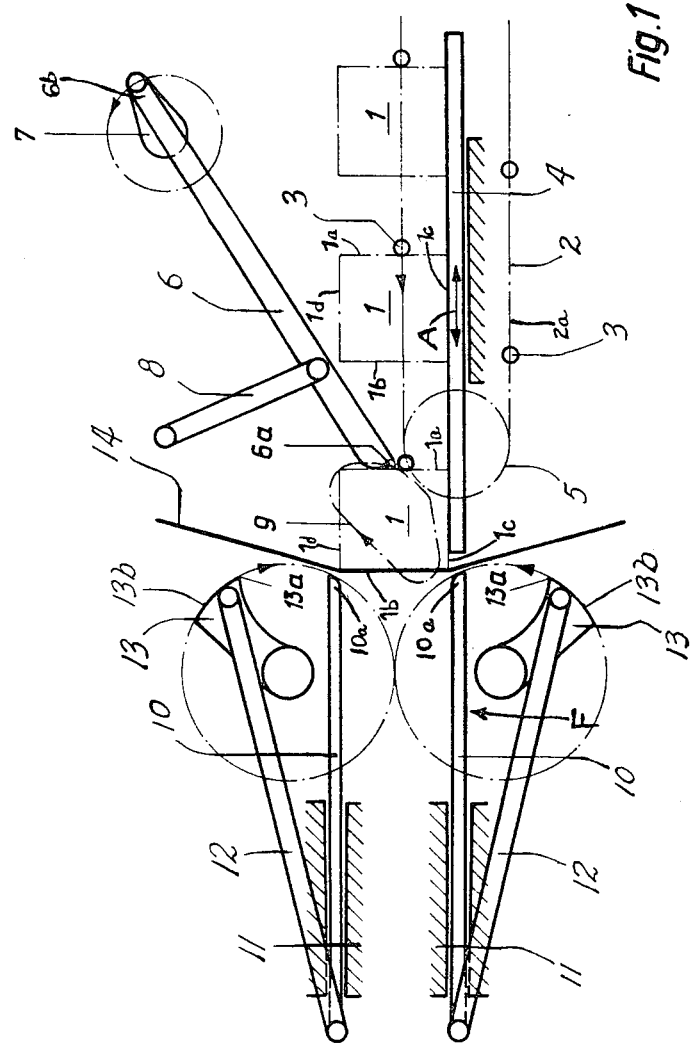
Figure 2:
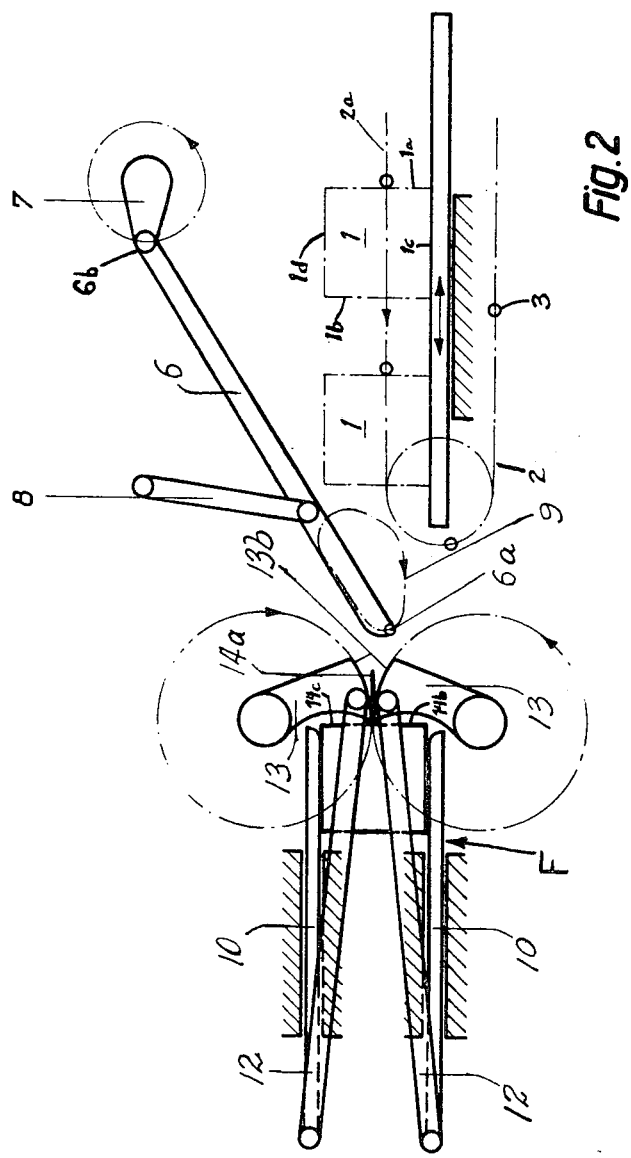
Figure 3:
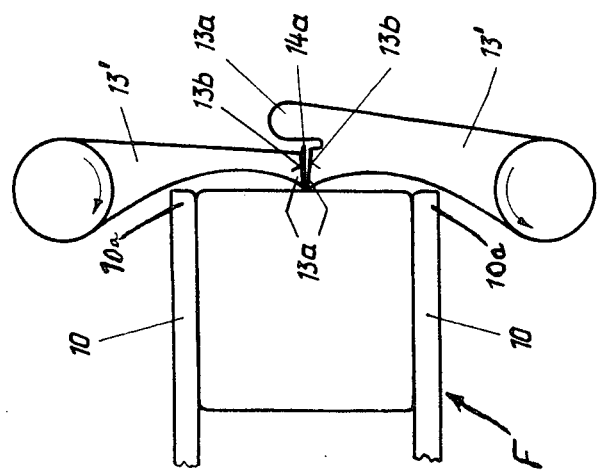
Figure 4:
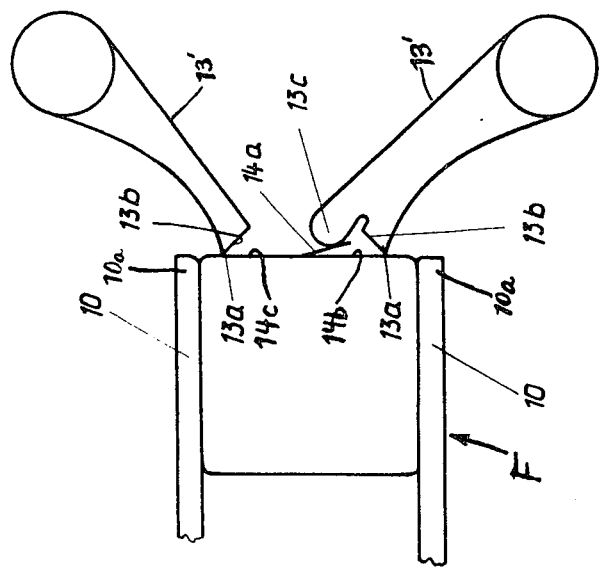

Other features, objects and advantages of the invention will become apparent by reference to the following detailed description and drawings in which:

FIGURE 1 schematically illustrates a side view of a first embodiment of inventive wrapping apparatus depicting an object just as it is about to be pushed into a folding compartment;

FIGURE 2 schematically illustrates the apparatus of FIGURE 1 in its working position at the beginning of welding or heat-sealing of the transverse seam of wrapping material;

FIGURES 3 and 4 depict a modified construction of closing and welding jaws in two different working positions;

FIGURE 5 schematically illustrates a variant construction of the wrapping apparatus of FIGURE 1 utilising a different construction and arrangement of closing and welding jaws; and FIGURE 6 illustrates an exemplary embodiment of drive arrangement for the closing and welding jaws of FIGURE 5.

Describing now the drawings and, more specifically considering first the exemplary embodiment of inventive wrapping apparatus shown in FIGURES 1 and 2, it will be seen that the objects or articles 1 which are to be wrapped with blanks or sheets of wrapping material 14 are advanced in a predetermined direction of movement by an endless conveyor or transport means 2, for instance incorporating an endless chain 2a to which spaced entrainment members 3 are operably connected. During transit of these objects 1 they rest upon a support slide 4 which carries out a to-and-fro movement in the direction of the double-headed arrow A by means of any suitable drive (not shown). The objects 1 are supported upon the movable slide 4, which can be considered to be part of the conveyor system, until such time as they enter the folding compartment means or shed, generally designated by reference character F.

It will be further observed that pusher means 6 are arranged above the article-discharge end of the conveyor means 2 where there is located a deflecting wheel or gear 5 over which the chain 2a is trained. It will be understood that for convenience in illustration the opposite end of the conveyor means 2 has been omitted from the drawing, yet a similar deflecting or turning gear can be assumed to be located at such non-illustrated end. Pusher means 6 is connected at one end 6b, remote from its operable or free end 6a, with a crank drive 7, and intermediate its ends 6a, 6b it is pivotably mounted to a lever 8. The operable end 6a of pusher means 6, which has the function of pushing the articles or objects 1 into the folding compartment F, describes a closed curve or path 9 during each rotation of the crank 7. Conveniently, such has been termed a so-called "conjugate or coupled curve," since it is dependent upon both the movement of the crank 7 and the supporting of the pusher means 6 by the lever 8.

Considering now specific physical structure of the folding compartment means or folding shed F in which the objects 1 are enclosed within the wrapping material 14, it will be recognized that this folding compartment F embodies two substantially parallel and spaced plates 10 mounted for axial movement in guide means 11. In this embodiment, both of the plates 10 are connected by respective rods 12 providing a crank drive for these plates 10, with rotatable closing and welding jaws 13, the latter of which can be electrically heated for example. Due to this arrangement, both plates 10 carry out an axial movement towards and away from the objects 1 during rotation of the closing and welding jaws 13.

The manner of operation of the just-described inventive wrapping apparatus depicted in FIGURES 1 and 2 is as follows:

As soon as an article or object 1 approaches the discharge end of the conveyor means 2 where the entrainment means 3 are turned about the deflecting wheel 5 the pusher means 6 is applied via its operable end 6a to the back 1a of the forwardmost object 1, pushing the latter between the spaced plates 10 forming the folding compartment F. A blank or sheet of wrapping material 14 provided for instance with a thermoplastic coating, is located in front of the forward ends 10a of the plates 10. This wrapping material 14 is held by suitable delivery means well known to the art and for such reason not shown or considered in greater detail, particularly since such does not constitute part of the present invention. When the object 1 is pushed between the plates 10 then the sheet or blank of wrapping material 14 is laid about three sides of this object, namely the forwardmost side 1b and the lower and upper sides 1c and 1d respectively. As best seen by referring to FIGURE 2, the closing and welding jaws 13 rotating towards one another now fold, by means of their edges 13, the protruding ends 14b, 14c of the wrapping material 14 against the vertical rear side 1a of the object 1, so that in the middle of this side 1a two superimposed flaps 14a of wrapping material 14 project substantially perpendicularly away from the aforesaid side 1a. Upon further rotation of the closing and welding jaws 13 these protruding flaps 14a are pressed together and heat-sealed or welded by the heated surfaces 13b of the aforesaid jaws 13. At the same time, the movable plates 10 straddling the wrapped article 1 move away from the confronting discharge end of the conveyor means 2, so that the latter can advance the next object 1 into a position for receipt by the pusher means 6. The wrapped or enclosed object 1 located between the plates 10 is then guided by non-illustrated means to a further work station where the wrapping material 14 which is still open at its opposed ends is folded-in and heat-sealed in known manner.

FIGURES 3 and 4 depict a somewhat modified construction of closing and welding jaws 13' capable of use with the wrapping apparatus of FIGURES 1 and 2. In this embodiment both closing and welding jaws 13' also possess two edges 13a for folding-in the ends 14b, 14c of the blank or sheet of wrapping material 14 and two surfaces 13b for welding the protruding flaps 14a. Apart from this structure, the lower closing and sealing jaw 13' possesses a protruding nose or cam 13c. This has the function of bending down and fixedly welding the heat-sealed and perpendicularly projecting flaps 14a depending laterally of the rear wall 1a of the object 1 (see FIGURE 4). Advantageously, at least one of the flaps 14a is somewhat longer than the surfaces 13b of the jaw 13' effective in welding the flap seam, so that there is obtained a faultless connection of the marginal edge of the welded flaps 14a with the sleeve or jacket of wrapping material 14 surrounding the object 1.

In the event the wrapping material enclosure or jacket for the objects 1 should not exhibit any projecting weld seam then an arrangement as shown in FIGURE 5 is employed, whereby the edge portions or ends 14b, 14c of the wrapping material projecting out of the folding compartment F are folded in overlapping relation and then welded or heat-sealed. For this purpose, the closing and welding jaws 15, 16 have imparted thereto a somewhat different movement than that of the embodiment discussed in conjunction with FIGURES 1 and 2. In this case, the lower jaw member 15 only serves for folding-in the edge portion 14b of the wrapping material 14. It rotates uniformly and is not heated. On the other hand, the closing and welding jaw 16 in addition to its uniform rotational movement has superimposed thereon a pulsating movement, so that it somewhat trails the jaw 15 during folding-in of the edge portion 14c and until such time as the other edge portion 14b has been folded-in. When this happens, the closing and folding jaw 16 rotates quicker and presses the edge portion 14c onto the outer face of edge portion 14b and welds or heat-seals them together. For this purpose, the surface 16a of the jaw 16 is electrically heated for instance.

Now in order to obtain the non-uniform rotational movement of the closing and welding jaw 16 there can be used, by way of example, a drive means of the type schematically illustrated in FIGURE 6. By referring to this figure it will be observed that a rotatable shaft 17 carries the likewise rotatable closing jaw 15 and is uniformly driven by the main drive of the machine, which for convenience in illustration has not been shown. Shaft 17 transmits its rotational movement through the agency of a spur gear 24 to an intermediate gear 25 driving a gear 26. The latter is fixedly mounted upon a shaft 18a. This shaft 18a carries at one end 18d a crank 19 and at the other end 18c a bevel gear 26 of a differential drive or gearing, generally designated by reference character D. The bevel gear 26 transmits its uniform rotational movement via the bevel gears 27 to a bevel gear 28 fixedly mounted upon a shaft 18b. Closing and welding jaw 16 is operatively connected with this shaft 18b. The crank 19 is connected through the intermediary of a rod 20 with an arm 21 seated at the end 22a of a shaft 22 and possessing a greater length than the crank 19. Thus, when the crank 19 rotates, the arm 21 carries out an oscillatory movement as such is generally indicated in FIGURE 5 by double-headed arrow B. A gear segment 23 is seated upon the shaft 22 and meshes with the teeth of the cage or housing 29 of the differential gearing D and likewise imparts to such a pulsating movement. This movement is transmitted via the shaft 30 to the bevel gears 27. In this manner, an additional oscillation or pulsating movement is superimposed upon the uniform rotation of the shaft 18b which brings about the previously described trailing and subsequent hurrying-up movements of the closing and welding jaw 16. The pulsating or intermittent movement of the closing and welding jaw 16 can, however, also be achieved in a different manner. It will be clearly understood that the described drive arrangement only depicts an exemplary embodiment for achieving this result. It is further mentioned that in the embodiment of FIGURE 5 both of the plates 10 of the folding compartment F are either only moved by the uniformly rotating closing jaw 15 or else then by a separate drive. Naturally, instead of the shown drive connection between the jaws 13 or 13' and the plates 10 of the other embodiments, a separate drive could also be used.

While there is shown and described present preferred embodiments of the invention it is to be distinctly understood that the invention is not limited thereto but may be otherwise variously embodied and practised within the scope of the following claims.

What is claimed is:

1. Apparatus for wrapping objects with blanks of wrapping material comprising conveyor means for transporting objects along a predetermined path in the direction of folding compartment means, folding compartment means including a pair of spaced and movable plate members for receiving the objects from said conveyor means and for applying a blank of wrapping material about each object, pusher means including an operable end for receiving said objects from said conveyor means and for pushing them into said folding compartment means between said pair of spaced and movable plate members, means mounting said pusher means so that said operable end describes a closed path of movement, means providing rotatable closing and welding jaws adjacent said pair of spaced and movable plate members for folding-in and welding the ends of said wrapping material, and means interconnecting said closing and welding jaws with said pair of spaced and movable plate members for displacing the latter in an oscillatory axial direction.

2. Apparatus for wrapping objects with blanks of wrapping material according to claim 1 wherein said mounting means for said pusher means includes a crank connected to an end of said pusher means remote from said operable end and a lever member pivotably connected intermediate the ends of said pusher means.

3. Apparatus for wrapping objects with blanks of wrapping material according to claim 1 wherein said conveyor means includes an axial to-and-fro movable object-supporting slide means.

4. Apparatus for wrapping objects with blanks of wrapping material according to claim 1 wherein said rotatable closing and welding jaws incorporate a pair of jaw members, one of said jaw members possessing a protruding nose for folding-in and welding a flap projecting from the wrapping material enclosing an associated object to the wrapping material.

5. Apparatus for wrapping objects with blanks of wrapping material according to claim 1 wherein said rotatable closing and welding jaws include a first jaw member constructed for only closing one end of the wrapping material and a second jaw member constructing for closing and welding the other end of the wrapping material with said one end, means for imparting a uniform rotational movement to both said first and second jaw members, and means for superimposing a pulsating movement onto said uniform movement of said second jaw member in order to achieve at least intermittent lagging of said second jaw member with respect to said first jaw member.

6. Apparatus for wrapping objects with finite pieces of wrapping material comprising folding compartment means including a pair of spaced and movable plate members for receiving objects and for applying a piece of wrapping material about each object, means mounting said folding compartment means for oscillatory movement in axial direction, means for displacing said folding compartment means, pusher means for pushing objects between said pair of spaced and movable plate members of said following compartment means, and jaw means cooperating with said folding compartment means for folding-in and welding together the ends of the wrapping material encircling each object.

7. Apparatus for wrapping objects with finite pieces of wrapping material comprising folding compartment means including a pair of spaced and movable plate members for receiving objects and for applying a piece of wrapping material about each object, means mounting said folding compartment means for oscillatory movement in axial direction, means for displacing said folding compartment means, pusher means including an operable end for pushing objects between said pair of spaced and movable plate members of said folding compartment means, means for mounting said pusher means so that said operable end describes a predetermined path of movement, and jaw means cooperating with said folding compartment means for folding-in and welding together the ends of the wrapping material encircling each object.

References Cited

UNITED STATES PATENTS

| | | | |
|---|---|---|---|
| 1,805,693 | 5/1931 | Gladeck | 53—229 |
| 2,486,892 | 11/1949 | Sumida | 53—233 |
| 2,620,608 | 12/1952 | Smith | 53—228 |
| 2,813,387 | 11/1957 | Hopton | 53—229 |

FOREIGN PATENTS

| | | |
|---|---|---|
| 841,288 | 7/1960 | Great Britain. |

TRAVIS S. McGEHEE, *Primary Examiner.*

N. ABRAMS, *Assistant Examiner.*